United States Patent
Tarascon et al.

(10) Patent No.: US 10,637,059 B2
(45) Date of Patent: Apr. 28, 2020

(54) METHOD FOR PRODUCING A POSITIVE ELECTRODE COMPOSITE MATERIAL FOR NA ION BATTERY

(71) Applicant: CENTRE NATIONAL DE LA RECHERCHE SCIENTIFIQUE, Paris (FR)

(72) Inventors: Jean-Marie Tarascon, Paris (FR); Patrick Rozier, Toulouse (FR); Biao Zhang, Paris (FR)

(73) Assignees: CENTRE NATIONAL DE LA RECHERCHE SCIENTIFIQUE, Paris (FR); COLLEGE DE FRANCE, Paris (FR); SORBONNE UNIVERSITE, Paris (FR); UNIVERSITE TOULOUSE III—PAUL SABATIER, Toulouse (FR)

( * ) Notice: Subject to any disclaimer, the term of this patent is extended or adjusted under 35 U.S.C. 154(b) by 204 days.

(21) Appl. No.: 15/736,536

(22) PCT Filed: Jun. 15, 2016

(86) PCT No.: PCT/EP2016/063775
§ 371 (c)(1),
(2) Date: Dec. 14, 2017

(87) PCT Pub. No.: WO2016/202871
PCT Pub. Date: Dec. 22, 2016

(65) Prior Publication Data
US 2018/0190990 A1    Jul. 5, 2018

(30) Foreign Application Priority Data

Jun. 19, 2015 (EP) ..................................... 15305957

(51) Int. Cl.
*H01M 4/04* (2006.01)
*H01M 4/62* (2006.01)
(Continued)

(52) U.S. Cl.
CPC ............... *H01M 4/62* (2013.01); *H01M 4/04* (2013.01); *H01M 4/131* (2013.01); *H01M 4/133* (2013.01); *H01M 4/136* (2013.01); *H01M 4/1391* (2013.01); *H01M 4/1397* (2013.01); *H01M 4/505* (2013.01); *H01M 4/525* (2013.01);
(Continued)

(58) Field of Classification Search
CPC .......... H01M 4/136; H01M 4/04; H01M 4/62; H01M 4/587; H01M 4/131; H01M 4/1391; H01M 4/1397; H01M 10/054; H01M 4/133; H01M 4/505; H01M 4/525;
(Continued)

(56) References Cited

PUBLICATIONS

Singh Gurpreet et al.: "An approach to overcome first cycle irreversible capacity in P2-Na2/3[Fe1/2Mn1/2] 02" Electrochemistry Communications, vol. 37, Oct. 11, 2013, pp. 61-63.
(Continued)

*Primary Examiner* — Cynthia K Walls
(74) *Attorney, Agent, or Firm* — Troutman Sanders LLP (57) ABSTRACT

The present invention relates to a method for producing a positive electrode composite material comprising at least one Na-based positive electrode active material and $Na_3P$ for a battery using sodium ions as electrochemical vector, to a positive electrode comprising such a positive electrode composite material, and to the Na-ion battery comprising such a positive electrode.

17 Claims, 5 Drawing Sheets

(51) Int. Cl.
*H01M 4/131* (2010.01)
*H01M 4/133* (2010.01)
*H01M 4/136* (2010.01)
*H01M 4/1391* (2010.01)
*H01M 4/1397* (2010.01)
*H01M 4/505* (2010.01)
*H01M 4/525* (2010.01)
*H01M 4/58* (2010.01)
*H01M 10/054* (2010.01)
*H01M 4/587* (2010.01)
*H01M 4/60* (2006.01)
*H01M 4/02* (2006.01)

(52) U.S. Cl.
CPC ......... *H01M 4/587* (2013.01); *H01M 4/5825* (2013.01); *H01M 10/054* (2013.01); *H01M 4/5815* (2013.01); *H01M 4/60* (2013.01); *H01M 2004/028* (2013.01)

(58) Field of Classification Search
CPC ......... H01M 4/5825; H01M 2004/028; H01M 4/5815; H01M 4/60
See application file for complete search history.

(56) References Cited

PUBLICATIONS

Naoaki Yabuuchi et al: "Research Development on Sodium-Ion Batteries", Chemical Reviews, vol. 114, No. 23, Dec. 10, 2014, pp. 11636-11682.
Komaba Shinichi et al.: Rechargeable Na-ion batteries for large format applications, 2014 International Renewable and Sustainable Energy Conference, Oct. 17, 2014, pp. 651-654.
International Search Report dated Aug. 11, 2016.
European Search Report dated Nov. 9, 2015.

METHOD FOR PRODUCING A POSITIVE ELECTRODE COMPOSITE MATERIAL FOR NA ION BATTERY

RELATED APPLICATION

This application is a National Phase of PCT/EP2016/063775, filed on Jun. 15, 2016 which in turn claims the benefit of priority from European Patent Application No. 15 305 957.1, filed on Jun. 19, 2015, the entirety of which are incorporated by reference.

FIELD OF THE INVENTION

The present invention relates to a method for producing a positive electrode composite material comprising at least one Na-based positive electrode active material and $Na_3P$ for a battery using sodium ions as electrochemical vector, to a positive electrode comprising such a positive electrode composite material, and to the Na-ion battery comprising such a positive electrode.

Description of Related Art

There are batteries called lithium-ion (Na-ion) batteries that use a carbon derivative at the negative electrode. The carbon derivative may be a "soft" carbon, containing primarily $sp^2$ carbon atoms, a "hard" carbon containing primarily $sp^3$ carbon atoms, or an intermediate variety of carbon in which coexist variable proportions of $sp^2$ carbon atoms and $sp^3$ carbon atoms. The carbon derivative may also be natural graphite or artificial graphite, optionally covered with ungraphitized carbon which protects against exfoliation during electrochemical operation. The major drawback of these materials is the consumption of a part of the current, and hence of lithium ions originating from the positive electrode, during the first charge, the result of this being the formation, on the negative electrode of a protective layer, called passivating layer (or SEI layer), which prevents subsequent reaction of the electrolyte on the negative electrode into which the lithium is inserted. This phenomenon gives rise to a decrease in the energy density of the battery, since the lithium rendered unusable is withdrawn from the positive-electrode material, which has a low specific capacity (90-210 mAh·$g^{-1}$). In practice, between 5% and 25% of the initial capacity is lost in this way.

Also known is the use as negative-electrode material of transition metal fluorides, oxides, sulfides, nitrides, or phosphides, or of lithium and transition metal fluorides, oxides, sulfides, nitrides, or phosphides, said transition metals being selected from $T^M$=V, Cr, Mn, Fe, Co, Ni, Cu, and Zn. By reaction with the lithium, these materials form a two-phase system comprising the metal $T^M$ and, respectively, LiF, $Li_2O$, $Li_2S$, $Li_3N$, or $Li_3P$, in the form of a mixture of particles having nanometric sizes. These reactions are called "conversion" reactions and exhibit a substantial capacity (400 to 800 mAh·$g^{-1}$). The low size of the grains in the two-phase mixture formed endows this reaction with a certain reversibility, since transport by diffusion/migration need be ensured only over distances of a few nanometers. However, the electrodes of this type, whose design and implementation are simple, have the drawback of an irreversible first-cycle capacity of 30% to 45%, thereby inhibiting their commercial development.

In addition, large-scale application of Li ion batteries, are facing challenges related to scarcity of lithium resources and high cost.

The most appealing alternative to Li-ion batteries regarding chemical element abundance and cost is by all means sodium. Batteries using sodium ions as electrochemical in place of lithium ions are employed for use in place of lithium in applications where the stored energy density is less critical than for portable electronics or automotive transport, more particularly for the management of renewable energies. Such awareness has prompted the revival of the Na-ion battery concept with intense activity devoted to the search of highly performing electrode material. As in Li-ion batteries, regarding Na-ion negative electrode, carbon is the most attractive together with the use of Na-alloys with among them the $Na_xSb$ phases being the most performing one. Turning now to positive electrodes, polyanionic compounds such as $NaFePO_4$, $Na_3V_2(PO_4)_2F_3$, $Na_2Fe_2(SO_4)_3$, $Na_3V_2(PO_4)_3$ or layered compounds such as Na-based nickel manganese cobalt oxide phases (NMC phases) such as $NaNi_{1/3}Mn_{1/3}Co_{1/3}O_2$ or P2-layered phases such as $Na_{2/3}[Fe_{1/2}Mn_{1/2}]O_2$ phase which contain about 0.7 Na ions (Nat) per formula unit, are presently most studied candidates. The "hard carbons", which can also be used as negative-electrode material for Na-ions batteries, can give reversible $Na^+$ insertions of the order of 200 mAh·$g^{-1}$, but here as well the formation of a passivating layer is necessary and represents a loss of 15% to 40% on the first cycle.

Research has then been carried out into means of compensating this loss of sodium, which in practice diminishes the energy density, since it is technically not possible to remove the fraction of positive-electrode material which has served to form the passivating layer, said fraction remaining as a dead weight during the subsequent operation of the battery.

The best theoretical way to fight cycle irreversible capacity in Na-ion batteries would be somewhat similar to what has been done for Si electrodes in Li-ion batteries in which Si in contact with a thin Li foil by pressure leads in situ in the cell to the formation of $Li_xSi$ once the electrolyte is added, $Li_xSi$ then compensate to loss of Li ions during the formation of the passivating layer of the negative electrode. However, this solution cannot be applied to Na-ion batteries due to the practical limitation of making Na foils.

It is also not possible to simply add metallic sodium in positive electrode composite materials because metallic sodium is very reactive with moisture. Na is very difficult to deal with because sticking to spatula, tweezers and so on. Moreover, only bulk Na is available without any powder form existed.

From EP-0 966 769 the addition is known of an alkali metal oxo carbon to the active material of a positive electrode in a battery which operates by circulation of lithium ions between the electrodes, for the purpose of at least partly remedying the loss in capacity during the 1st cycling, resulting from the formation of a passivating layer. However, during the 1st cycling of the battery, oxidation of the oxo carbon produces anion radicals which are soluble in an electrolyte, the effect of this being to degrade the negative electrode. There is indeed improvement in the initial capacity, but at the expense of the lifetime of the battery.

Proposals have also been made to add $NaN_3$ as sacrificial salt in positive electrode composite materials comprising $Na_{2/3}[Fe_{1/2}Mn_{1/2}]O_2$ as positive electrode active material, acetylene black (AB) as electronic conducting agent and polyvinylidene difluoride (PVDF) as binding agent in a ratio $Na_{2/3}[Fe_{1/2}Mn_{1/2}]O_2$:$NaN_3$:AB:PVDF=75:5:15:10, said composite being coated on an aluminum foil and Na metal being used as negative electrode with a glass microfiber used as separator. 1 M $NaClO_4$ in a solvent mixture (ethylenecarbonate/prolylenecarbonate 1:1) was used as electrolyte in the electrochemical cell testing (Singh G. et al., Electrochemistry Communications, 2013, 37, 61-63). This positive electrode composite material was tested in comparison with a positive electrode composite material which was identical except that it did not comprise $NaN_3$. For the testing cell in which the positive electrode material did not comprise $NaN_3$, the first charge capacity was observed to be 139 mAh/g, which corresponds to the extraction of about 0.45 sodium ions from the structure. While discharging, more sodium was inserted back in the structure, hence a high discharge capacity of 197 mAh/g was obtained. First cycle missing capacity is thus 59 mAh/g. However in the same configuration, if $Na_{2/3}[Fe_{1/2}Mn_{1/2}]O_2$ was used as positive electrode active material with hard carbon or any other material without Na as negative electrode active material, then the apparent capacity of $Na_{2/3}[Fe_{1/2}Mn_{1/2}]O_2$ would have not been achieved because carbon is not a Na reservoir and the need to built a SEI, making this unfeasible. By comparison, when $NaN_3$ was present at an amount of 5 w % in the positive electrode composite material, the missing capacity was reduced to 27 mAh/g, demonstrating an improvement of about 50%. This enhancement is due to the decomposition of $NaN_3$ into Na and $N_2$ during the first cycle. However, the use of $NaN_3$ as sacrificial salt in the positive electrode composite material to alleviate irreversible capacities in Na-ion batteries is not totally satisfactory because the presence of $N_3^-$ into the electrode material are prejudicial to the performances of the battery. In addition, in $NaN_3$, the use of 3 N atoms are needed to bring only one Na atom to the composite, which has the drawback of adding weight to the corresponding electrode composite material and thus to the Na-ion battery incorporating such an electrode. Finally, the production of $N_2$ volatile species during the first charge of the battery is prejudicial to the cohesion of the electrode material.

There is therefore still a need of providing Na-ion batteries exhibiting improved performances in terms of irreversible capacity during the first charge, while being at the same time safe and not too heavy.

Objects and Summary

Thus the aim of the present invention is to provide a battery which uses sodium ions as electrochemical vector, with its operation enhanced by reduction in the loss of capacity during the first discharge/charge cycle.

This aim is achieved by a method for producing a positive electrode composite material for a battery using sodium ions as electrochemical vector, wherein said method comprises at least one step of mixing a powder of $Na_3P$ with a powder of at least one positive-electrode active material capable of inserting sodium ions reversibly, said step of mixing being carried out in a dry atmosphere and without heating.

Thanks to this method, it is now possible to prepare a positive electrode composite material comprising an intimate mixture of $Na_3P$ and at least one Na-based positive-electrode active material capable of inserting sodium ions reversibly. When said composite is then used as active material of a positive electrode, $Na_3P$ contained in the composite material liberates Na ions to compensate for the irreversibility of the negative carbon electrode, hence increasing the overall energy density (a reduction of more than 50% of the irreversible capacity is obtained). Moreover, the P atoms remaining after the first charge of the battery are in solid form into the electrode composite material rather than in volatile form (as compared to the use of $NaN_3$).

Another advantage is that P has a molecular weight of 31 g and is able to bring 3 Na ions while, in the case of $NaN_3$, 3 N atoms are needed to bring only 1 Na ion.

According to the present invention, the expression "Na-based positive-electrode active material capable of inserting sodium ions reversibly" refers to P2 type layered crystalline Na-phases comprising Na and at least one oxide of at least one element selected from the group consisting of Fe, Mn, Co, Ni, P, S, Mn, V, Ti, and/or others solid crystalline Na-phases.

The Na-based positive-electrode active material capable of inserting sodium ions reversibly may be selected from:
  lamellar fluorophosphates $Na_2TPO_4F$ in which T represents a divalent element selected from Fe, Mn, Co, and Ni, and in which T may be replaced partially by Mg or Zn;
  fluorosulfates $NaT'SO_4F$ in which T' represents at least one element selected from Fe, Mn, Co, and Ni, a part of T' being optionally replaced by Mg, and a part of the sulfate groups $SO_4^{2-}$ of which is optionally replaced by the isosteric and iso-charge group $PO_3F^{2-}$;
  polysulfides $Na_2S_n$ ($1 \leq n \leq 6$), and sodium salts of dimercaptothiadiazole and of dimercaptooxazole;
  dithiocarbamates $Na[CS_2NR'R'']$ in which each of the groups R' and R'' represents a methyl, ethyl, or propyl radical, or else R' and R'' form a ring (for example, pyrrolidine or morpholine);
  $Na_2Fe_2(SO_4)_3$;
  $NaFePO_4$, $Na_3V_2(PO_4)_3$, $Na_3V_2(PO_4)_2F_3$;
  P2 type layered crystalline Na-phases selected from $Na_{0.67}Fe_{0.5}Mn_{0.5}O_2$, $Na_{0.67}MnO_2$, $Na_{0.74}CoO_2$, $Na_{0.67}Co_{0.67}Mn_{0.33}O_2$, $Na_{0.67}Ni_{0.25}Mn_{0.75}O_2$ and $Na_{0.67}Ni_{1/3}Mn_{2/3}O_2$;
  $NaNi_{1/3}Mn_{1/3}Co_{1/3}O_2$.

Among these Na-based positive electrode active materials, one can more particularly mention $Na_2Fe_2(SO_4)_3$, $NaFePO_4$, $Na_3V_2(PO_4)_3$, $Na_3V_2(PO_4)_2F_3$, $Na_{0.67}Fe_{0.5}Mn_{0.5}O_2$, $Na_{0.67}MnO_2$, $Na_{0.74}CoO_2$, $Na_{0.67}Co_{0.67}Mn_{0.31}O_2$, $Na_{0.67}Ni_{1/3}Mn_{2/3}O_2$ and $NaNi_{1/3}Mn_{1/3}Co_{1/3}O_2$.

According to a preferred embodiment of the present invention, the Na-based positive electrode active material is $Na_2Fe_2(SO_4)_3$ or $Na_{0.67}Fe_{0.5}Mn_{0.5}O_2$ or $Na_3V_2(PO_4)_2F_3$ or $Na_3V_2(PO_4)_3$.

The amount of $Na_3P$ preferably varies from 2 w % to 40 w %, with regard to the weight of Na-based positive electrode active material. In particular, the amount of $Na_3P$ can be adjusted depending on how many Na are required to compensate the irreversible capacities.

Within the meaning of the present invention, the expression "dry atmosphere" means that the atmosphere is anhydrous or moisture-free. Preferably, the atmosphere contains less than 20 ppm of water.

Within the meaning of the present invention, the expression "without heating" means that the method is implemented without any external source of heating.

In other terms, it is possible that the mixing step involves a heating (or temporary heating) of the reactants during said mixing, for example due to friction or exothermic reactions. However, the heating is inherent to said mixing step and not to an external source of heating.

According to a particulate embodiment of the present invention, the mixing step can be performed in the presence of an electronically conducting agent in powder form, such as carbon powder.

In that case, the powder of electronically conductive agent can be added at any time of the mixing step. The amount of electronically conductive agent can vary from about 2 to 40 weight % with regard to the total amount of powder materials (powders of $Na_3P$ and positive electrode active material), and more preferably from about 5 to 15 weight %.

The mixing step can be carried out by any means allowing the obtaining of an intimate mixture of $Na_3P$ with the Na-based positive electrode active material in the form of a composite, such as by mixing in a mortar with pestle or by a ball-milling process.

According to a particulate and preferred embodiment of the present invention, the mixing step is performed by ball-milling.

The step of mixing, and in particular of ball-milling, is preferably carried out with an inert gas (i.e. under inert atmosphere) such as argon or nitrogen, and preferably in a glove box filled with said inert gas. According to a particulate embodiment of the present invention, argon is preferred.

The step of ball-milling is preferably performed at a temperature ranging from 20 to 300° C., and more preferably from 25 to 80° C. Indeed, this ball-milling temperature is inherent to ball-milling process and no external source of heating is used to provide such temperatures.

According to an even more preferred embodiment of the present invention, the ball-milling step is carried out in a hard steel ball-miller jar containing a weight of milling-balls ($W_{mb}$) such as the weight ratio $W_{mb}/W_s$, with $W_s$ being the total weight of powder materials contained in the jar ($Na_3P$ powder, Na-based positive electrode active material and optionally powder of an electronically conductive agent), ranges from about 10 to 60, preferably from about 20 to 60, and more preferably from about 30 to 50.

The volume of solid materials into the ball-miller is preferably ⅓ lower than the volume of the ball-miller jar.

The process according to the invention can be carried out in a ball-miller operating by vibrating movements of the balls in the three spatial directions or in a ball-miller operating by centrifuging movements of the balls.

As an example of ball-miller operating by vibrating movements of the balls, one can mention the ball-miller sold under the reference 8000M by Spex® comprising a metallic jar having an intern volume of 30 $cm^3$ and a vibration frequency set at 875 cycles/minute (clamp speed).

As an example of ball-miller operating by centrifuging movements of the balls (planetary ball-miller), one can mention the ball-miller sold under the reference PM 100 by Retsch. This ball-miller operates at a speed ratio of 1/(−1) and a rotation speed up to 1000 rotations per minute (rpm). In this type of ball-miller, grinding is essentially carried out thanks to the balls that crush the powders and solids against the inner wall of the jar. Grinding is therefore essentially carried out by pressure and friction. The combination of impact forces and friction forces ensures a very high and efficient degree of grinding of planetary ball-millers.

When the ball-milling step of the process of the invention is performed in a ball-miller operating by centrifuging movements of the balls, the rotation speed is preferably set at a value ranging from about 200 and 1000 rpm, and more preferably from about 400 and 650 rpm.

The duration of the ball-milling step may vary depending on the rotation speed set for the ball-miller and on the amount of solid materials to grind. In order to avoid a temperature rise, the ball-milling step can be performed in several grinding sequences, said sequences being separated by breaks allowing the decrease of the temperature inside the jar. As an example, when a Spex® 8000M or Retsch PM 100 ball miller is used, the ball-milling step can be carried out according to a sequence of alternating series of 30 minutes of grinding and 15 minutes of break.

In said ball-millers, the effective duration of the ball-milling step (not including breaking times) can vary from about 0.1 to 5 hours, preferably from about 0.2 to 2 hours, and more preferably from about 0.3 to 0.9 hour.

The molar ratio $Na_3P$/Na-based positive electrode active material capable of inserting sodium ions reversibly used in the method of the present invention can generally vary from about 0.01 to about 1, and preferably from about 0.05 to about 0.5.

The positive electrode composite material obtained at the end of the process can be used immediately or stored, preferably under an inert atmosphere.

It comprises at least one Na-based positive electrode active material capable of inserting sodium ions reversibly and $Na_3P$, preferably in the form of an intimate mixture.

The Na-based positive electrode active material capable of inserting sodium ions reversibly is as defined in the present invention.

The positive electrode composite material obtained according to the process defined as the first object of the present invention can be used as positive electrode active material for Na-ion batteries.

A second object of the present invention is therefore the use of a positive electrode composite material obtained according to the process according to the first object of the present invention, as positive electrode active material for Na-ion batteries.

A third object of the present invention is a positive electrode for a Na-ion battery composed of an electrode material and a current collector, wherein said electrode material comprises a positive electrode composite material as obtained according to the process defined by the first object of the present invention.

In a preferred embodiment of the present invention, the amount of positive electrode composite material varies from 60 to 100 w %, and more preferably from 80 to 95 w % with regard to the total amount of the electrode material.

In addition to the positive electrode composite material, the electrode material may comprise one or more binders conferring mechanical strength to the electrode material.

The binder is preferably a polymer which has a high modulus of elasticity (e.g. of the order of several hundred MPa), and which is stable under the temperature and voltage conditions in which the positive electrode is intended to operate. The binder maintains adhesion of the positive electrode material to the current collector, maintain ionic contact, and facilitate the formation of a stable interface with the electrolyte.

The binder may be selected from fluoropolymers such as poly(vinylidene fluoride) (PVDF) or poly(tetrafluoroethylene), cellulose fibers, cellulose derivatives such as starch, carboxymethyl cellulose (CMC), diacetyl cellulose hydroxyethyl cellulose or hydroxypropyl cellulose, styrene butadiene rubber (SBR) and a mixture thereof.

The amount of binder may vary from 0 to 40 w %, preferably, from 3 to 10 w % with regard to the total weight of the positive electrode material.

In addition to the positive electrode composite material, the electrode material may also comprise at least one electronically conductive agent. The conductive agent may be carbon black, Super P carbon black, acetylene black, ketjen black, channel black, natural or synthetic graphite, carbon fibers, carbon nanotubes, vapor grown carbon fibers or a mixture thereof.

The amount of electronically conductive agent may vary from 0 to 40 w %, preferably, from 5 to 15 w % with regard to the total weight of the positive electrode material.

The current collector may be composed of a conductive material, more particularly of a metallic material which may be selected from aluminium, copper, steel and iron.

A fourth object of the present invention is a battery using sodium ions as electrochemical vector (Na-ion battery), said battery comprising:
- at least one positive electrode,
- at least one negative electrode,
- said positive and negative electrodes being separated by an electrolyte comprising at least one sodium salt, wherein the positive electrode is as defined in the third object of the present invention.

The active material used for the negative electrode can be a selected among any negative active materials having large irreversible capacities such as carbon materials, in particular carbon nanofibers or carbon felt, which may also act as current collector.

According to a preferred embodiment of the present invention, the active material of the negative electrode is a carbon material.

The electrolyte of the Na-ion battery according to the invention is generally a solution comprising a salt of sodium and a solvent.

The solvent may be a liquid solvent, optionally gelled by a polymer, or a polar polymer solvent which is optionally plasticized by a liquid.

The proportion of liquid solvent in the solvent may vary from about 2% by volume (corresponding to a plasticized solvent) to about 98% by volume (corresponding to a gelled solvent).

The a sodium salt is preferably selected from the group consisting of $NaClO_4$, $NaBF_4$, $NaPF_6$, $Na_2SO_4$, $NaNO_3$, $Na_3PO_4$, $Na_2CO_3$, sodium salts having a perfluoroalkanesulfonate anion, sodium bis(perfluoroalkanesulfonyl)methane, sodium tris(perfluoroalkanesulfonyl)methane and sodium bis(perfluoroalkanesulfonyl)imide (e.g. NaTFSI, also known under the chemical name sodium bis(trifluoromethanesulfonyl)imide).

The liquid solvent may be composed of at least one polar aprotic solvent selected from cyclic and linear carbonates (e.g. ethylene carbonate, propylene carbonate, butylene carbonate, dimethyl carbonate, diethyl carbonate, dipropyl carbonate, ethyl methyl carbonate, vinylene carbonate, fluoroethylene carbonate), esters, nitriles (e.g. acetonitrile, benzonitrile), nitro derivatives (nitromethane, nitrobenzene), amides (e.g. dimethylformamide, diethylformamide, N-methylpyrrolidone), sulfones (e.g. dimethylsulfone, tetramethylene sulfone), sulfolanes, alkylsulfamides (tetraalkylsulfonamides having from 5 to 10 carbon atoms), partially hydrogenated hydrocarbons, cyclic and linear ethers (e.g. diethyl ether, tetrahydrofuran, dimethoxyethane, dioxane, glyme, dimethyltetrahydrofuran, methyl), polyethylene glycol ethers (e.g. $RO(CH_2CH_2O)_nR'$ in which R and R' are $CH_3$ or $C_2H_5$ and $1 \leq n \leq 12$), tetraalkyl sulfamides (e.g. $RR'NSO_2NR''R'''$ in which R, R', R'', and R''' are $CH_3$ or $C_2H_5$), 3-methyl-1,3-oxazolidin-2-one, and cyclic esters (e.g. γ-butyrolactone).

Said liquid solvent may optionally be gelled by addition of a polymer obtained, for example, from one or more monomers selected from ethylene oxide, propylene oxide, methyl methacrylate, methyl acrylate, acrylonitrile, methacrylonitrile, N-vinylpyrrolidone and vinylidene fluoride, said polymer having a linear, comb, random, alternating, or block structure, and being crosslinked or not.

When the electrolyte is a liquid electrolyte, said liquid impregnates a separator. The separator may be a conventional polymer-based separator such as a Celgard® separator or a Whatman® borosilicate glass fiber separator.

In a preferred embodiment, the electrolyte is a solution comprising a salt of sodium and one or more carbonates selected from ethylene carbonate, propylene carbonate, dimethylcarbonate, vinylene carbonate, and fluoroethylene carbonate.

A Na-ion battery according to the invention may be composed of a single electrochemical cell comprising two electrodes (i.e. one positive electrode and one negative electrode) separated by an electrolyte; or of a plurality of chemical cells assembled in series; or of a plurality of chemical cells assembled in parallel; or of a combination of the two assembly types.

DETAILED DESCRIPTION

The present invention is illustrated in more detail in the examples below, but it is not limited to said examples.

Example 1

Preparation of $Na_3P/Na_2Fe_2(SO_4)_3$ Composite Material by Ball-Milling

In this example, a $Na_3P/Na_2Fe_2(SO_4)_3$ positive electrode composite material has been prepared.

1) Preparation of $Na_2Fe_2(SO_4)_3$

Firstly, $Na_2Fe_2(SO_4)_3$ was prepared by solid state reaction of $Na_2SO_4$ and $FeSO_4$ according to the method disclosed by Yamada A. (Nature Communications, 2014(5), 4538).

2) Preparation of $Na_3P$ by Ball-Milling

Stoichiometric amounts of metallic sodium as bulk (1.38 g, Sigma) and red phosphorus (0.62 g, Alfa, 325 mesh) were filled into a hard steel ball-milled jar of a Spex® 8000M ball-miller (30 cm³) in an Ar-filled glove box and equipped with seven hard steel balls each having a weight of 7 g and a diameter of 12 mm. These solid materials were ball milled for 2-10 h to obtain $Na_3P$ particles.

3) Preparation of $Na_3P/Na_2Fe_2(SO_4)_3$ Composite Material 0.8 g of $Na_2Fe_2(SO_4)_3$ obtained according to step 1) above and 0.05 g of $Na_3P$ obtained according to step 2) above were filled into a hard steel ball-milled jar of a Spex® 8000M ball-miller (30 cm³) in an Ar-filled glove box and equipped with four hard steel balls each having a weight of 7 g and a diameter of 12 mm. These materials were ball milled for 0.3 h to obtain particles of $Na_3P/Na_2Fe_2(SO_4)_3$ composite material.

Example 2

Preparation of a Full Cell with $Na_3P/Na_2Fe_2(SO_4)_3$ Composite Material as Positive Electrode Material

In this example, $Na_3P/Na_2Fe_2(SO_4)_3$ composite material prepared according to example 1, has been used as positive electrode active material to assemble a Na-ion battery comprising carbon nanofibers as negative electrode and 1M $NaClO_4$ in ethylene carbonate (EC)/dimethylcarbonate DMC)(1:1 by volume) as liquid electrolyte.

1) Preparation of Carbon Nanofibres (CNFs)

CNFs were produced by electrospinning using polyacrylonitrile as precursor according to the method disclosed by Kim J K. (Advanced Energy Materials, 2014, 4, 1301448.)

2) Assembly of the Na-Ion Battery

CNFs and $Na_3P/Na_2Fe_2(SO_4)_3$ composite material were respectively used as negative and positive electrodes, in a coin cells to evaluate the electrochemical performance of Na-ion batteries. A Na foil was used as the counter electrode, with 1M $NaClO_4$ in EC/DMC (1:1 by volume) as the liquid electrolyte and glass fiber (Whatman®, GF/D) as the separator. The cells were tested in a VMP system (Biologic S.A., Claix, France).

For comparison purpose, a comparative Na-ion battery not forming part of the present invention has also been prepared using the same amount of $Na_2Fe_2(SO_4)_3$ alone as positive electrode active material in place of the $Na_3P/Na_2Fe_2(SO_4)_3$ composite material prepared according to example 1.

3) Cycling Performances

Each battery was sealed and then a reducing current corresponding to a rate of 0.2 C was applied. The capacity was calculated based on the weight of $Na_2Fe_2(SO_4)_3$.

For each Na-ion battery, the cycling performances were studied. They are reported on FIG. 1 annexed on which the voltage (in V) is a function of capacity (in mAh/g).

Figure 1:
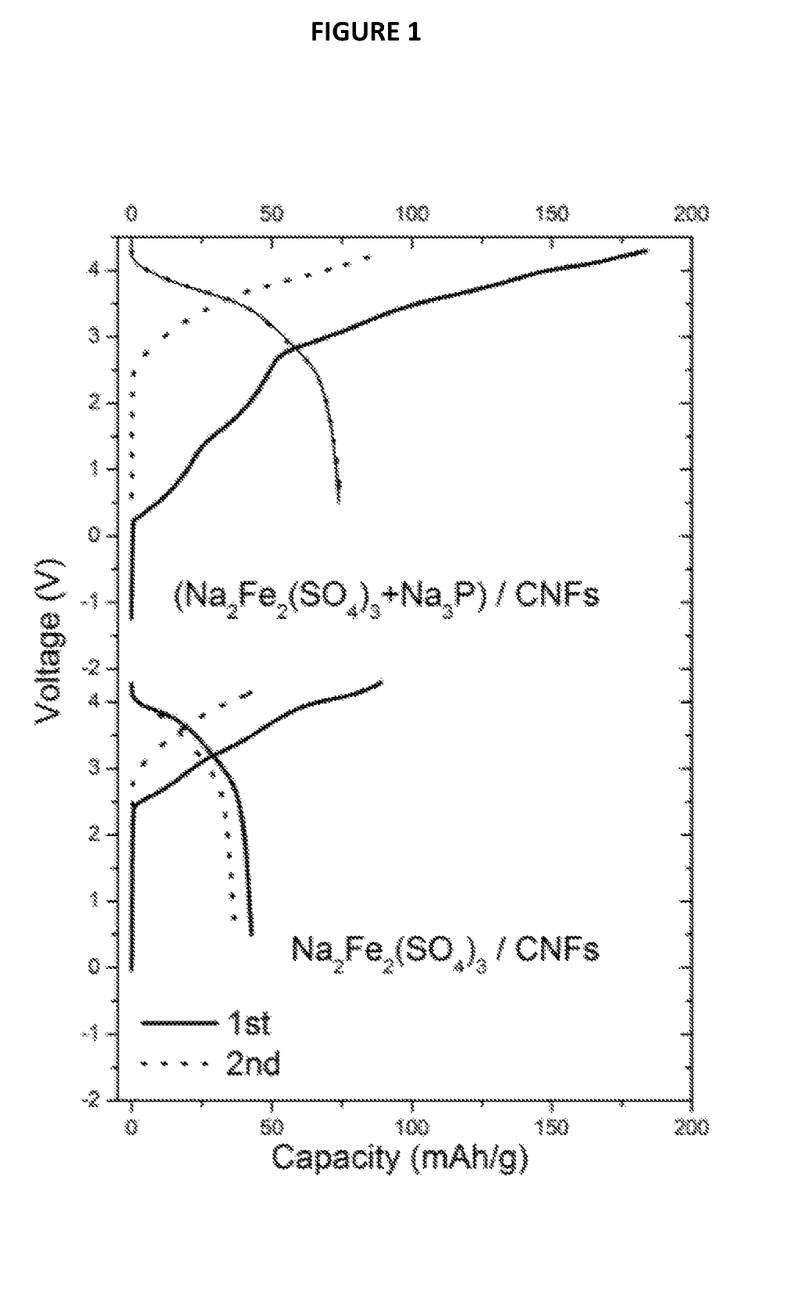
FIG. 1 is a chart showing voltage (in V) as a function of capacity (in mAh/g) from Example 2.

These results show that there is large irreversible capacity in the first cycle for the battery comprising only $Na_2Fe_2(SO_4)_3$ as positive electrode active material (battery not forming part of the present invention) which has a capacity of about 88 mAh/g with about 50% coulombic efficiency in the 1st cycle. The majority capacity loss is attributed to the SEI formation on the carbon electrode which consumed Na. For the battery according to the invention, i.e. comprising $Na_3P/Na_2Fe_2(SO_4)_3$ composite material, the results show the capacity was increased from 43 to 74 mAh/g demonstrating that the use of such a composite material makes it possible to fight against irreversible capacity in Na-ion batteries.

Example 3

Preparation of $Na_3P/Na_3V_2(PO_4)_3$ Composite Material by Ball-Milling

In this example, a $Na_3P/Na_3V_2(PO_4)_3$ positive electrode composite material has been prepared.

1) Preparation of $Na_3V_2(PO_4)_3$

Firstly, $Na_3V_2(PO_4)_3$ was prepared by solid state reaction according to the method reported by J Yamaki et al. (Journal of the Electrochemical Society, 2010, 157(4), A536-A543).

2) Preparation of $Na_3P/Na_3V_2(PO_4)_3$ Composite Material 1.5 g of $Na_3V_2(PO_4)_3$ and 0.2 g of $Na_3P$ (prepared according to the method given in step 2) of example 1) were filled into a hard steel ball-milled jar (30 cm$^3$) (Spex® 8000M) in an Ar-filled glove box and equipped with six hard steel balls each having a weight of 7 g and a diameter of 12 mm $Na_3P/Na_3V_2(PO_4)_3$ composite material was obtained after ball milling for 0.5 h.

3) Electrochemical Performances

Figure 2:
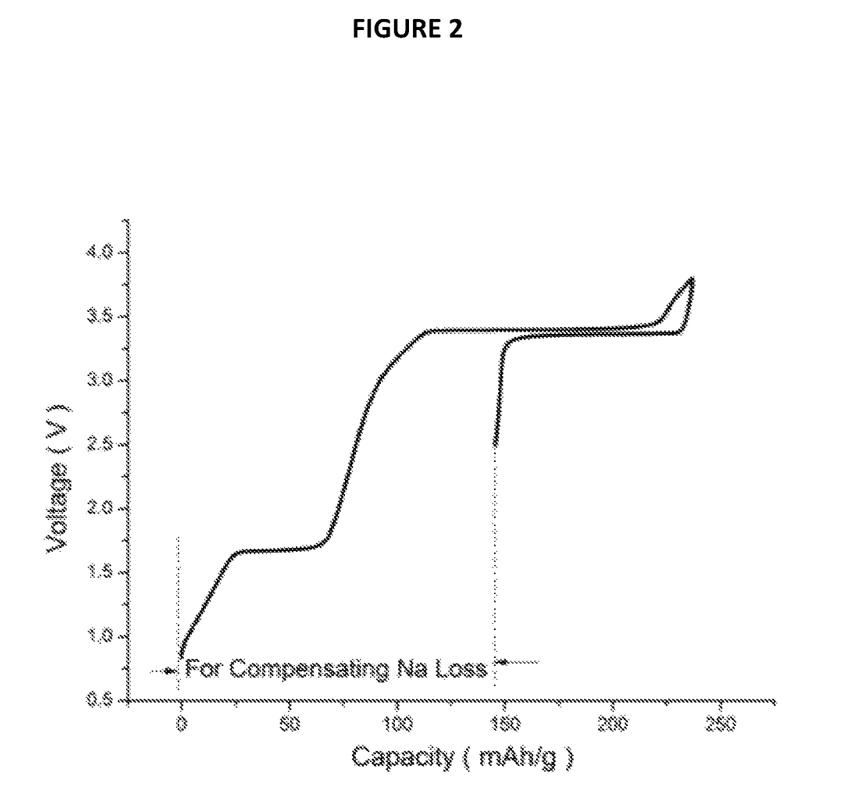
FIG. 2 is a chart showing Voltage (V) as a function of Capacity (in mAh/g) from Example 3.

The electrochemical performance of $Na_3P/Na_3V_2(PO_4)_3$ composite material thus obtained were tested in a Na cell identical to the one used in example 2 with $Na_3P/Na_3V_2(PO_4)_3$ and Na metal as working and counter electrodes, respectively. The charge/discharge curve in the 1st cycle is shown in FIG. 2 annexed (Voltage (V) as a function of Capacity (mAh/g)). The Na that extracted from first plateau at about 1.6V can be used for compensating Na loss in SEI formation.

Example 4

Preparation of $Na_3P/Na_3V_2(PO_4)_2F_3$ Composite Material by Ball-Milling

In this example, a $Na_3P/Na_3V_2(PO_4)_2F_3$ (NVPF) positive electrode composite material has been prepared (denoted $Na_3P/NVPF$).

1) Preparation of $Na_3V_2(PO_4)_2F_3$

Firstly, NVPF was prepared by solid state reaction of NaF and $VPO_4$ according to the method reported by Croguennec L et al. (Chemistry of Materials, 2014, 26, 4238).

2) Preparation of $Na_3P/Na_3V_2(PO_4)_2F_3$ Composite Material 0.8 g of NVPF and 0.07 g of $Na_3P$ (prepared according to the method given in step 2) of example 1) were filled into a hard steel ball-milled jar (30 cm$^3$) (Spex® 8000M) in an Ar-filled glove box and equipped with four hard steel balls each having a weight of 7 g and a diameter of 12 mm $Na_3P/NVPF$ composite material was obtained after ball milling for 0.5 h.

3) Electrochemical Performances

Figure 3:
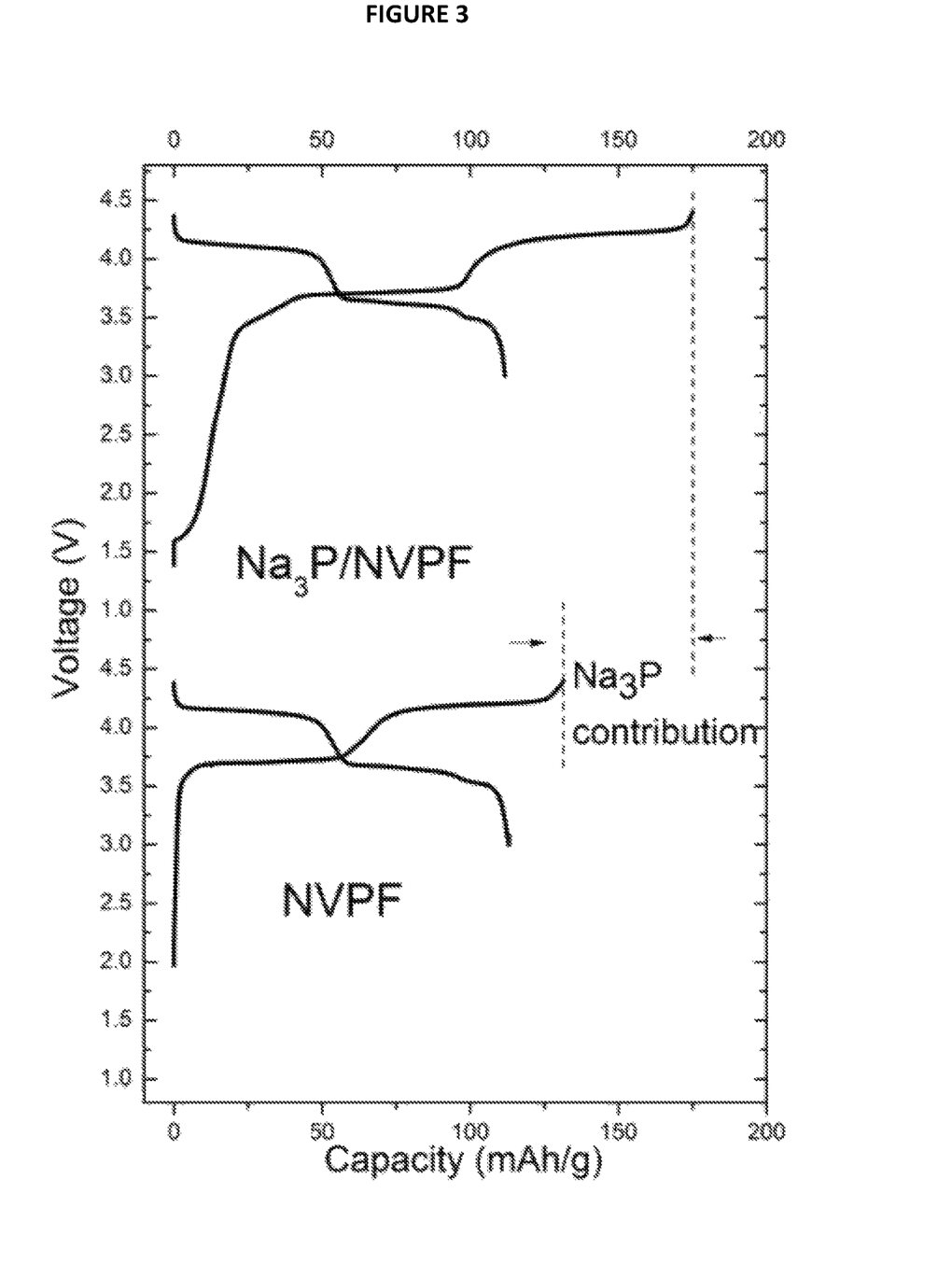
FIG. 3 is a chart showing Voltage (V) as a function of Capacity (in mAh/g) from Example 4.

The electrochemical performance of $Na_3P/NVPF$ composite material thus obtained were tested in a Na cell identical to the one used in example 2 with $Na_3P/NVPF$ and Na metal as working and counter electrodes, respectively. The charge/discharge curve in the 1st cycle is shown in FIG. 3 annexed (Voltage (V) as a function of Capacity (mAh/g)). These results demonstrate that the additional charge capacity in the 1st cycle contributed by $Na_3P$ could be used for compensating Na consumed in SEI formation in a full cell.

Example 5

Preparation of a Full Cell with $Na_3P/Na_3V_2(PO_4)_2F_3$ Composite Material as Positive Electrode Material

In this example, $Na_3P/NVPF$ composite material prepared according to example 4, has been used as positive electrode active material to assemble a Na-ion battery comprising hard carbon as negative electrode and 1M $NaClO_4$ in EC/DMC (1:1 by volume) as liquid electrolyte.

1) Preparation of Hard Carbon Anode

Hard carbon was produced by pyrolysis of glucose according to the method disclosed by J. R. Dahn et al. (Journal of the Electrochemical Society, 2000, 147, 1271.)

2) Assembly of the Na-Ion Battery

Hard carbon and $Na_3P/NVPF$ composite material (prepared according to the method given in step 2) of example 4) were used as anode and cathode, respectively, in a coin cells to evaluate the electrochemical performances of Na-ion batteries. A Na foil was used as the counter electrode, with 1M NaClO$_4$ in EC/DMC (1:1 by volume) as the electrolyte and glass fiber (Whatman®, GF/D) as the separator. The cells were tested in a VMP system (Biologic S.A., Claix, France).

For comparison purpose, a comparative Na-ion battery not forming part of the present invention has also been prepared using the same amount of NVPF alone as positive electrode active material in place of the Na$_3$P/NVPF composite material prepared according to example 4.

3) Cycling Performances

Each battery was sealed and then a reducing current corresponding to a rate of 0.2 C was applied. The capacity was calculated based on the weight of NVPF.

Figure 4:
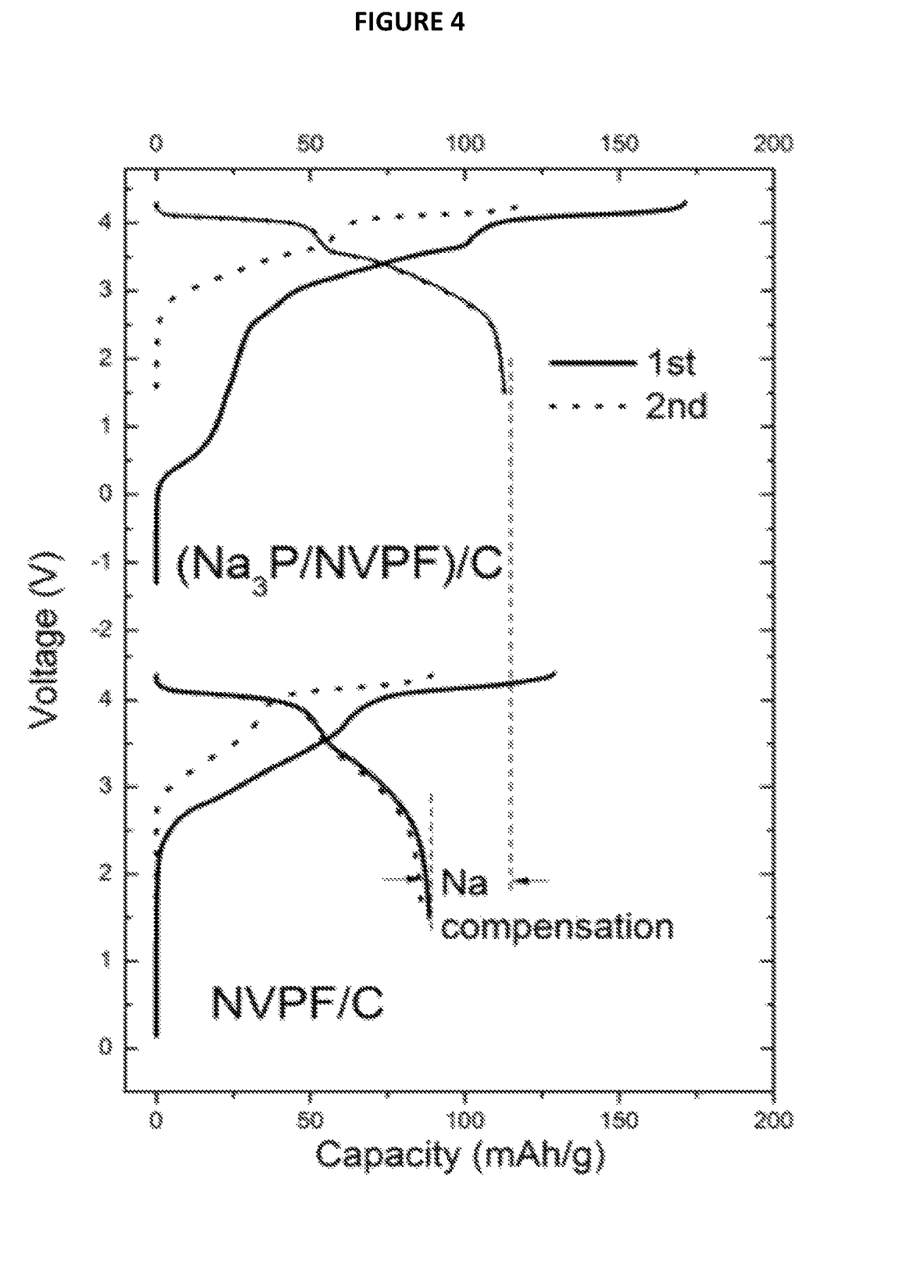
FIG. 4 is a chart showing Voltage (V) as a function of Capacity (in mAh/g) from Example 5.

For each Na-ion battery, the cycling performances were studied. They are reported on FIG. 4 annexed on which the voltage (in V) is a function of capacity (in mAh/g). These results show that there is large irreversible capacity in the first cycle for the battery comprising only NVPF as positive electrode active material (battery not forming part of the present invention) which has a coulombic efficiency of about 70% in the 1st cycle. The majority capacity loss is attributed to the SEI formation on the carbon electrode which consumed Na. For the battery according to the invention, i.e. comprising Na$_3$P/NVPF composite material, the results show the capacity was increased from 89 to 115 mAh/g demonstrating that the use of such a composite material makes it possible to fight against irreversible capacity in Na-ion batteries.

Example 6

Preparation of Na$_3$P/Na$_{0.67}$Fe$_{0.5}$Mn$_{0.5}$O$_2$ Composite Material by Ball-Milling 1) Preparation of Na$_{0.67}$Fe$_{0.5}$Mn$_{0.5}$O$_2$ Firstly, Na$_{0.67}$Fe$_{0.5}$Mn$_{0.5}$O$_2$ (denoted Na$_{0.67}$FMO) was prepared by solid state reaction according to the method reported by S Komaba et al. (Nature Materials, 2012, 11, 512).

2) Preparation of Na$_3$P/Na$_{0.67}$Fe$_{0.5}$Mn$_{0.5}$O$_2$ Composite Material Two type of Na$_3$P/Na$_{0.67}$FMO composite material was produced (Na$_3$P/Na$_{0.67}$FMO-1 composite material and Na$_3$P/Na$_{0.67}$FMO-2 composite material):

i) Preparation of Na$_3$P/Na$_{0.67}$FMO-1 composite material: 0.8 g of Na$_{0.67}$FMO and 0.09 g of Na$_3$P (prepared according to the method given in step 2) of example 1) were filled into a hard steel ball-milled jar (30 cm$^3$) (Spex® 8000M) in an Ar-filled glove box and equipped with four hard steel balls each having a weight of 7 g and a diameter of 12 mm Na$_3$P/Na$_{0.67}$FMO-1 composite was obtained after ball milling for 0.5 h.

ii) Preparation of Na$_3$P/Na$_{0.67}$FMO-2 composite material: The content of Na$_3$P has been further increased. 0.8 g of Na$_{0.67}$FMO and 0.18 g of Na$_3$P (prepared according to the method given in step 2) of example 1) were filled into a hard steel ball-milled jar with the same ball milling process as for the preparation of Na$_3$P/Na$_{0.67}$FMO-1 composite material.

Example 7

Preparation of a Full Cell with Na$_3$P/Na$_{0.67}$Fe$_{0.5}$Mn$_{0.5}$O$_2$ Composite Material as Positive Electrode Material In this example, Na$_3$P/Na$_{0.67}$FMO composite materials prepared according to example 6 (Na$_3$P/Na$_{0.67}$FMO-1 and Na$_3$P/Na$_{0.67}$FMO-2 composite materials), have been used as positive electrode active materials to assemble Na-ion batteries comprising hard carbon as negative electrode and 1M NaClO$_4$ in EC/DMC (1:1 by volume) as liquid electrolyte.

1) Preparation of Hard Carbon Anode

Hard carbon was the same as in example 5.

2) Assembly of the Na-Ion Battery

Hard carbon and each Na$_3$P/Na$_{0.67}$FMO composite material were used as anode and cathode, respectively, in a coin cells to evaluate the electrochemical performance of Na-ion batteries. A Na foil was used as the counter electrode, with 1M NaClO$_4$ in EC/DMC (1:1 by volume) as the electrolyte and glass fiber (Whatman®, GF/D) as the separator. The cells were tested in a VMP system (Biologic S.A., Claix, France).

For comparison purpose, a comparative Na-ion battery not forming part of the present invention has also been prepared using the same amount of Na$_{0.67}$FMO alone as positive electrode active material in place of the Na$_3$P/Na$_{0.67}$FMO composite materials prepared according to example 6.

3) Cycling Performances

Each battery was sealed and then a reducing current corresponding to a rate of 0.2 C was applied. The capacity was calculated based on the weight of Na$_{0.67}$FMO.

For each Na-ion battery, the cycling performances were studied. They are reported on FIG. 5 annexed on which the voltage (in V) is a function of capacity (in mAh/g).

Figure 5:
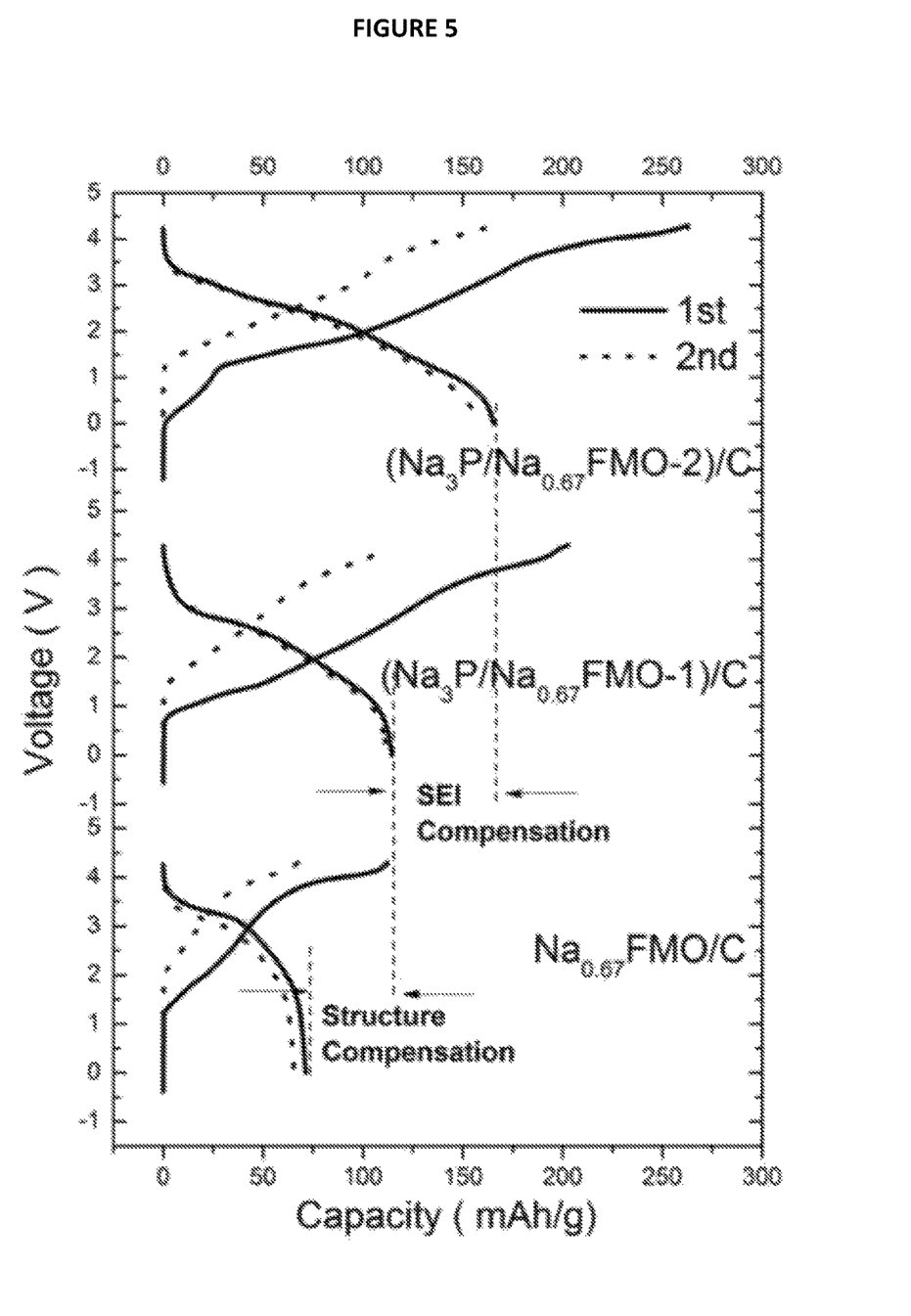
FIG. 5 is a chart showing Voltage (V) as a function of Capacity (in mAh/g) from Example 7.

These results show that there is large irreversible capacity in the first cycle for the battery comprising only Na$_{0.67}$FMO as positive electrode active material (battery not forming part of the present invention) which only has a capacity of 71 mAh/g. For the batteries according to the invention, i.e. comprising Na$_3$P/Na$_{0.67}$ FMO-1 composite material, the results show the capacity was increased from to 115 mAh/g, and further increased to 168 mAh/g when Na$_3$P/Na$_{0.67}$FMO-2 composite material was used as cathode material. These results demonstrate that the use of such a composite materials makes it possible to fight against irreversible capacity in Na-ion batteries.

The invention claimed is:

1. A method for producing a positive electrode composite material for a battery using sodium ions as electrochemical vector, wherein said method comprises at least one step of mixing a powder of Na$_3$P with a powder of at least one positive-electrode active material capable of inserting sodium ions reversibly, said step of mixing being carried out in a dry atmosphere and without heating.

2. The method of claim 1, wherein said positive-electrode active material is selected from:
   lamellar fluorophosphates Na$_2$TPO$_4$F in which T represents a divalent element selected from Fe, Mn, Co, and Ni, and in which T may be replaced partially by Mg or Zn;
   fluorosulfates NaT'SO$_4$F in which T' represents at least one element selected from Fe, Mn, Co, and Ni, a part of T' being optionally replaced by Mg, and a part of the sulfate groups SO$_4^{2-}$ of which is optionally replaced by the isosteric and iso-charge group PO$_3$F$^{2-}$;
   polysulfides Na$_2$S$_n$ (1≤n≤6), and sodium salts of dimercaptothiadiazole and of dimercaptooxazole;
   dithiocarbamates Na[CS$_2$NR'R"] in which each of the groups R' and R" represents a methyl, ethyl, or propyl radical, or else R' and R" form a ring;
   Na$_2$Fe$_2$(SO$_4$)$_3$;
   NaFePO$_4$, Na$_3$V$_2$(PO$_4$)$_3$, Na$_3$V$_2$(PO$_4$)$_2$F$_3$;

P2 type layered crystalline Na-phases selected from $Na_{0.67}Fe_{0.5}Mn_{0.5}O_2$, $Na_{0.67}MnO_2$, $Na_{0.74}CoO_2$, $Na_{0.67}Co_{0.67}Mn_{0.33}O_2$, $Na_{0.67}Ni_{0.25}Mn_{0.75}O_2$ and $Na_{0.67}Ni_{1/3}Mn_{2/3}O_2$; and $NaNi_{1/3}Mn_{1/3}Co_{1/3}O_2$.

3. The method according to claim 1, wherein Na-based positive electrode active material is selected from the group consisting of $Na_2Fe_2(SO_4)_3$, $NaFePO_4$, $Na_3V_2(PO_4)_3$, $Na_3V_2(PO_4)_2F_3$, $Na_{0.67}Fe_{0.5}Mn_{0.5}O_2$, $Na_{0.67}MnO_2$, $Na_{0.74}CoO_2$, $Na_{0.67}Co_{0.67}Mn_{0.31}O_2$, $Na_{0.67}Ni_{1/3}Mn_{2/3}O_2$ and $NaNi_{1/3}Mn_{1/3}CO_{1/3}O_2$.

4. The method according to claim 1, wherein the amount of $Na_3P$ varies from 2 w % to 40 w % with regard to the weight of positive electrode active material.

5. The method according to claim 1, wherein the mixing step is performed in the presence of an electronically conducting agent in powder form.

6. The method according to claim 1, wherein the mixing step is a step of ball-milling.

7. The method according to claim 6, wherein the step of ball-milling is carried out with an inert gas.

8. The method according to claim 6, wherein the step of ball-milling is performed at a temperature ranging from 25 to 80° C.

9. The method according to claim 6, wherein the ball-milling step is carried out in a hard steel ball-miller jar containing a weight of milling-balls ($W_{mb}$) such as the weight ratio $W_{mb}/W_s$, with $W_s$ being the total weight of powder materials contained in the jar, ranges from 10 to 60.

10. The method according to claim 6, wherein the ball milling step is carried out in a ball-miller operating by centrifuging movements of the balls at a rotation speed set at a value ranging from 200 and 1000 rotations per minute.

11. The method according to claim 6, wherein the effective duration of the ball-milling step varies from 0.1 to 5 hours.

12. A positive electrode active material for Na-ion batteries comprising a positive electrode composite material obtained according to the process defined in claim 1, said composite material comprising said at least one Na-based positive electrode active material and $Na_3P$.

13. A positive electrode for a Na-ion battery composed of an electrode material and a current collector, wherein said electrode material comprises a positive electrode composite material as obtained according to the process defined in claim 1, said positive electrode composite material comprising said at least one Na-based positive electrode active material and $Na_3P$.

14. The positive electrode according to claim 13, wherein the amount of positive electrode composite material varies from 60 to 100 w % with regard to the total amount of the electrode material.

15. A battery using sodium ions as electrochemical vector, said battery comprising:
    at least one positive electrode,
    at least one negative electrode,
        said positive and negative electrodes being separated by an electrolyte comprising at least one sodium salt,
    wherein the positive electrode is as defined in claim 13.

16. The battery of claim 15, wherein the active material of the negative electrode is a carbon material.

17. The battery of claim 16, wherein the carbon material of the negative electrode is composed of carbon nanofibers or of a carbon felt.

\* \* \* \* \*